(12) United States Patent
Takemoto

(10) Patent No.: US 6,514,624 B2
(45) Date of Patent: Feb. 4, 2003

(54) DECORATIVE SHEET

(75) Inventor: Masataka Takemoto, Tokyo (JP)

(73) Assignee: Dai Nippon Printing Co., Ltd. (JP)

( * ) Notice: Subject to any disclaimer, the term of this patent is extended or adjusted under 35 U.S.C. 154(b) by 0 days.

(21) Appl. No.: 09/780,568

(22) Filed: Feb. 12, 2001

(65) Prior Publication Data

US 2001/0046594 A1 Nov. 29, 2001

(30) Foreign Application Priority Data

Feb. 18, 2000 (JP) ........................................ 2000-040661

(51) Int. Cl.$^7$ .............................. B32B 9/04; B32B 3/00; B32B 27/28

(52) U.S. Cl. ...................... 428/447; 428/523; 428/195

(58) Field of Search ................................ 428/195, 446, 428/447, 500, 913, 523

(56) References Cited

U.S. PATENT DOCUMENTS 5,271,988 A * 12/1993 Ikemoto et al. ............. 428/195

FOREIGN PATENT DOCUMENTS

JP 5-278166 10/1993

* cited by examiner

Primary Examiner—Robert Dawson
Assistant Examiner—Michael J Feely
(74) Attorney, Agent, or Firm—Parkhurst & Wendel, L.L.P.

(57) ABSTRACT

A decorative sheet is provided which possesses excellent anti-transferability to a cellophane pressure-sensitive adhesive tape and, in addition, can be stably produced. The decorative sheet comprises: a substrate for a decorative sheet; and a surface protective layer provided on the substrate, the surface protective layer being formed of a crosslinked cured product of an ionizing radiation-curable resin composition, the composition containing, as an additive, a combination of silicone (meth)acrylate with a polyorganosiloxane organic copolymer.

3 Claims, 1 Drawing Sheet

DECORATIVE SHEET

TECHNICAL FIELD

The present invention relates to a decorative sheet for use, for example, in building interior materials, such as walls, and surface materials of, for example, fittings, such as doors, and furniture. More particularly, the present invention relates to a decorative sheet which possesses excellent anti-transferability to a cellophane pressure-sensitive adhesive tape and can be stably produced.

BACKGROUND OF THE INVENTION

In general, surface properties, such as scratch resistance and stain resistance, have hitherto been required of decorative sheets used in the above applications. In order to cope with this, for example, Japanese Patent Publication No. 31033/1974 discloses a decorative sheet which has been produced by printing a pattern layer on a paper substrate, coating an unsaturated polyester prepolymer coating composition onto the surface of the printed substrate to form a coating, and then applying an electron beam to the coating to cause crosslinking and curing of the coating, thereby forming a surface protective layer.

Regarding the surface properties, in some cases, the anti-transferability to a cellophane pressure-sensitive adhesive tape is required such that, when paper (such as a poster or a calendar) or the like is applied to the decorated sheet with a cellophane pressure-sensitive adhesive tape and is then peeled off from the decorative sheet, only the cellophane pressure-sensitive adhesive tape is cleanly peeled off without the separation of the pattern layer, the substrate layer or other layer together with the tape. In order to meet this demand, for example, Japanese Patent No. 2856862 discloses a decorative sheet, as a sheet wherein not only surface properties, such as abrasion resistance, chemical resistance, and stain resistance, but also the anti-transferability to a cellophane pressure-sensitive adhesive tape has been taken into consideration, which has been produced by printing a pattern layer onto a paper substrate, coating an ionizing radiation-curable resin coating composition comprising an (meth)acrylate prepolymer and an (meth)acrylate monomer and, added thereto, silicone (meth)acrylate as a release agent on the printed substrate to form a coating, and applying an electron beam or ultraviolet light to the coating to cause crosslinking and curing of the coating, thereby forming a surface protective layer.

When attention is given to the anti-transferability to a cellophane pressure-sensitive adhesive tape, however, the method described in Japanese Patent No. 2856862 has the following drawbacks. Specifically, in the formation of the surface protective layer, wherein the type of and amount of the silicone (meth)acrylate added has been taken into consideration, since the silicone component is likely to localize (coagulate), the formed decorative sheet does not always have satisfactory anti-transferability to a cellophane pressure-sensitive adhesive tape. The addition of finely divided silica as a dispersant to prevent the localization can provide desired anti-transferability to a cellophane pressure-sensitive adhesive tape. This, however, poses a different problem. More specifically, the addition of the finely divided silica deteriorates the stability of the ionizing radiation-curable resin coating composition for the formation of the surface protective layer, and, during the storage of the coating composition, the dispersion state varies with the elapse of time. This leads to a variation in properties of the formed decorative sheet and thus makes it impossible to produce decorative sheets having stable properties including the anti-transferability to a cellophane pressure-sensitive adhesive tape.

DISCLOSURE OF THE INVENTION

Accordingly, it is an object of the present invention to provide a decorative sheet which possesses satisfactory anti-transferability to a cellophane pressure-sensitive adhesive tape and can be stably produced.

In order to attain the above object, according to the present invention, there is provided a decorative sheet comprising: a substrate; and, stacked on the surface of the substrate, at least a surface protective layer formed of a crosslinked cured product of an ionizing radiation-curable resin composition containing silicone (meth)acrylate as a release agent and a polyorganosiloxane organic copolymer as a dispersant.

The incorporation of the polyorganosiloxane organic copolymer, in addition to the silicone (meth)acrylate, into the ionizing radiation-curable resin composition for the surface protective layer can prevent the localization of the silicone (meth)acrylate, can provide satisfactory anti-transferability to a cellophane pressure-sensitive adhesive tape, can prevent a variation in this property, can prevent a change in the state of dispersion of the silicone (meth)acrylate in the coating composition with the elapse of time, and thus can realize stable production of decorative sheets. The silicone (meth)acryalte functions as a release agent, and the polyorganosiloxane organic copolymer functions as a dispersant for the release agent.

BEST MODE FOR CARRYING OUT THE INVENTION

The decorative sheet of the present invention will be described with reference to the following preferred embodiments.

Figure 1:
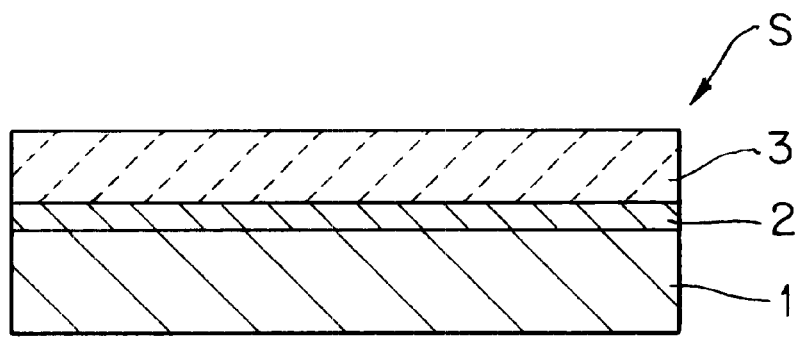
FIG. 1 is a cross-sectional view showing one embodiment of the decorative sheet according to the present invention.
Figure 2:
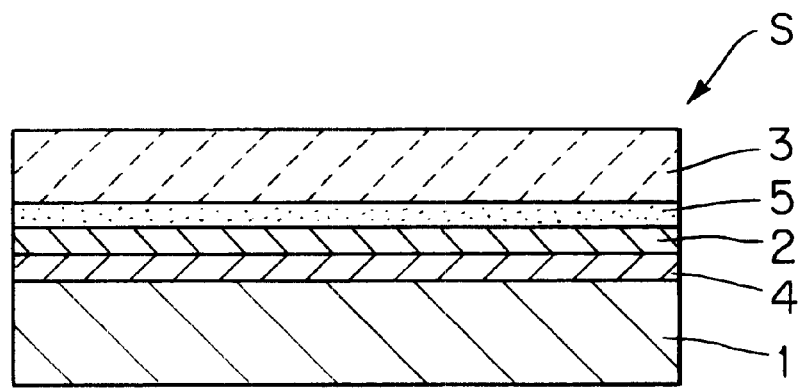
FIG. 2 is a cross-sectional view showing another embodiment of the decorative sheet according to the present invention.

At the outset, FIG. 1 is a cross-sectional view showing one embodiment of the decorative sheet according to the present invention. A decorative sheet S shown in FIG. 1 has a construction such that a pattern layer 2 and a surface protective layer 3 formed of a specific material have been stacked in that order onto a substrate 1. FIG. 2 is a cross-sectional view showing another embodiment of the decorative sheet according to the present invention. A decorative sheet S shown in FIG. 2 has a construction such that a sealer layer 4, a pattern layer 2, a primer layer 5, and a surface protective layer 3 formed of a specific material have been stacked in that order on a permeable substrate 1, such as paper.

As shown in FIG. 1, the decorative sheet S according to the present invention has a layer construction comprising a substrate 1 and, stacked on the surface of the substrate 1, at least a surface protective layer 3. In general, as shown in the drawing, a pattern layer 2 is in many cases provided in addition to the surface protective layer. As shown in FIG. 2, other layers may be properly provided according to need so far as the surface protective layer constitutes the outermost surface. Specifically, in the decorative sheet according to the embodiment shown in FIG. 2, a sealer layer 4 is provided between the substrate 1 selected from permeable materials, such as paper, and the pattern layer 2, and a primer layer 5 is interposed between the pattern layer 2 and the surface protective layer 3.

In this connection, it should be noted that, among these layers, the pattern layer 2, the sealer layer 4, and the primer layer 5 are optionally provided layers, and may be if necessary omitted when the omission has no adverse effect on the properties, suitability for the production, or design.

Each of these layers will be described in more detail.

Substrate

Sheets (including plates) formed of various materials, such as fibrous sheets, resin sheets, metal sheets, and wood sheets, may be used as the substrate 1. Fibrous sheets usable herein include: various types of paper, such as tissue paper, kraft paper, wood free paper, linter paper, baryta paper, parchment paper, and Japanese paper; and nonwoven fabrics formed of polyester resin, acrylic resin, nylon, vinylon, glass or other fibers. The fibrous sheet, such as paper or nonwoven fabric, may also be such that the adhesion strength between fibers in the fibrous sheet or between paper and other layer has been increased, or such that, in order to prevent fuzzing, a resin, such as acrylic resin, styrene-butadiene rubber, melamine resin, or urethane resin, has been added to the fibrous sheet, such as paper or nonwoven fabric, by resin impregnation after the production of the fibrous sheet or by internal addition in the course of the production of the fibrous sheet. In general, these fibrous sheets have a basis weight of about 20 to 100 g/m$^2$.

Resin sheets usable herein include sheets of polyolefin resins, such as polyethylene, polypropylene, polybutene, polymethylpentene, ethylene-propylene copolymer, and ethylene-propylene-butene copolymer, and olefin thermoplastic elastomers, acrylic resins, such as polymethyl (meth)acrylate, polybutyl (meth)acrylate, and methyl (meth)acrylate-butyl (meth)acrylate copolymer, polyester resins, such as polyethylene terephthalate and polybutylene terephthalate, polyvinyl chloride, and polycarbonate. The thickness of the resin sheet as the substrate is generally about 20 to 500 μm.

Pattern layer

The pattern layer 2 is a layer of a pattern printed using an ink (or a coating composition), for example, by a conventional printing method, such as gravure printing, silk screen printing, offset printing, gravure offset printing, or ink jet printing. The pattern may be, for example, a woodgrain pattern, a rift pattern, a texture pattern, a tile-like pattern, a brick-like pattern, a leather-like crepe pattern, characters, a geometrical pattern, or a full solid print. As with conventional inks (or coating compositions), the ink (or coating composition) for the pattern layer comprises a vehicle, such as a binder, a colorant, such as a pigment or a dye, and various optional additives added thereto. Binder resins usable herein include, for example, cellulosic resins, such as nitrocellulose, cellulose acetate, and cellulose acetate propionate, urethane resin, acrylic resin, vinyl chloride-vinyl acetate copolymer, and polyester resin. They may be used solely or as a mixture containing one or two or more of them. Colorants usable herein include: inorganic pigments, such as titanium white, carbon black, red oxide, chrome yellow, and ultramarine blue; organic pigments, such as aniline black, quinacridone, isoindolinone, and phthalocyanine blue; luster pigments, for example, titanium dioxide-covered mica and foils and powders of aluminum or the like; and dyes.

When the design or appearance of the substrate per se is utilized (for example, when a resin sheet with a colorant being incorporated thereinto by milling is used as the substrate) or when a colorant is added to the surface protective layer per se, the provision of this pattern layer 2 may be omitted.

Surface protective layer

The surface protective layer 3 may be formed by coating an ionizing radiation-curable resin (composition), prepared by adding a combination of silicone (meth)acrylate and a polyorganosiloxane organic copolymer as additives to an ionizing radiation-curable resin and bringing the mixture to a liquid, for example, by gravure coating or roll coating to form a coating which is then crosslinked to form a crosslinked, cured product. Further, the formation of the surface protective layer through full solid printing, for example, by gravure printing is also possible.

The coverage is preferably about 1 to 30 g/m$^2$ on solid basis.

The ionizing radiation-curable resin is preferably an ionizing radiation-curable composition prepared by properly mixing a prepolymer (including the so-called "oligomer") having in its molecule a radically polymerizable unsaturated bond or a cationically polymerizable functional group and/or a monomer having in its molecule a radically polymerizable unsaturated bond or a cationically polymerizable functional group. The term "ionizing radiation" used herein refers to electromagnetic waves or charged particles having energy which can polymerize or crosslink the molecule, and ultraviolet light (UV) or electron beam (EB) are generally used.

The prepolymer or monomer specifically comprises a compound having in its molecule, for examle, a radically polymerizable unsaturated group, such as an (meth)acryloyl or (meth)acryloyloxy group, or a cationically polymerizable functional group, such as an epoxy group. These prepolymers and monomers may be used alone or as a mixture of two or more. Here, for example, the (meth)acryloyl group refers to an acryloyl or methacryloyl group. A polyene/thiol prepolymer of a combination of a polyene with a polythiol is also preferred as the ionizing radiation-curable resin.

Examples of the prepolymer having in its molecule a radically polymerizable unsaturated group include polyester (meth)acrylate, urethane (meth)acrylate, epoxy (meth)acrylate, melamine (meth)acrylate, and triazine (meth)acrylate. The molecular weight of the prepolymer is generally about 250 to 100,000. The (meth)acrylate refers to acrylate or methacrylate.

Examples of the monomer having in its molecule a radically polymerizable unsaturated group include: monofunctional monomers, such as methyl (meth)acrylate, 2-ethylhexyl (meth)acrylate, and phenoxyethyl (meth)acrylate; and polyfunctional monomers, such as diethylene glycol di(meth)acrylate, propylene glycol di(meth)acrylate, trimethylolpropane tri(meth)acrylate, trimethylolpropane ethylene oxide tri(meth)acrylate, dipentaerythritol penta(meth)acrylate, and dipentaerythritol hexa(meth)acrylate.

Examples of the prepolymer having in its molecule a cationically polymerizable functional group include prepolymers of expoxy resins, such as bisphenol type epoxy resin and novolak type epoxy compounds, and vinyl ether resins, such as aliphatic vinyl ether and aromatic vinyl ether.

Thiols include polythiols, such as trimethylolpropane trithioglycolate and pentaerythritol tetrathioglycolate. Polyenes include polyurethane, produced from a diol and a diisocyanate, with allyl alcohol being added to both ends thereof.

When the coating is cured by the application of ultraviolet or visible light, a photopolymerization initiator is added to the ionizing radiation-curable resin. In the case of the resin system having a radically polymerizable unsaturated group, acetophenones, benzophenones, thioxanthones, benzoin, and benzoin methyl ethers may be used, as the photopolymerization initiator, solely or as a mixture of two or more. On the other hand, in the case of the resin system having a cationically polymerizable functional group, for example, aromatic diazonium salts, aromatic sulfonium salts, aromatic iodonium salts, metallocene compounds, and benzoinsulfonic esters may be used, as the photopolymerization initiator, solely or as a mixture of two or more.

The amount of the photopolymerization initiator added is about 0.1 to 10 parts by mass based on 100 parts by weight of the ionizing radiation-curable resin.

According to the present invention, silicone (meth)acrylate and polyorganosiloxane organic copolymer are further added in combination to the ionizing radiation-curable resin.

The silicone (meth)acrylate is a radically polymerizable prepolymer. For example, when a radically polyemerizable compound having in its molecule a radically polymerizable unsaturated group, such as a polyester acrylate prepolymer or an acrylate monomer, is used as the ionizing radiation-curable resin, this prepolymer, together with the radically polymerizable compound having in its molecule a radically polymerizable unsaturated group, is polymerized at the time of crosslinking and curing and consequently is incorporated as a part of the produced molecule. Thus, it is believed that the silicone (meth)acrylate functions as a release agent to impart excellent anti-transferability to a cellophane pressure-sensitive adhesive tape to the surface protective layer formed of a crosslinked, cured product.

Silicone (meth)acrylates usable herein include conventional compounds, for example, compounds wherein, for example, an (meth)acryloyloxy or (meth)acryloyl group has been introduced into one or both ends or side chain of silicone resin. In general, the molecular weight of the silicone (meth)acrylate is preferably about 250 to 100,000.

The polyorganosiloxane organic copolymer is a copolymer having both an organosiloxane chain and an organic polymer-derived chain. This copolymer is not necessarily required to be involved in the crosslinking-curing reaction at the time of the crosslinking and curing of the ionizing radiation-curable resin and consequently to be incorporated into a part of the produced molecule. Since the silicone (meth)acrylate has a siloxane chain in its molecule, the polyorganosiloxane organic copolymer is believed to function as a dispersant for effectively stabilizing the dispersion of the silicone (meth)acrylate.

The polyorganosiloxane organic copolymer may be, for example, a graft copolymer prepared, for example, by polyemerizing an organosiloxane, such as dimethylsiloxane, and a siloxane containing a vinyl polymerizable functional group, such as an acryl or methacryl group, to synthesize a polyorganosiloxane with a vinyl polymerizable functional group introduced into the main chain, and, further, graft polymerizing a vinyl polymerizable monomer (an organic monomer), for example, an alkyl (meth)acrylate such as methyl (meth)acrylate or ethyl (meth)acrylate, onto this polyorganosiloxane.

The amount of the silicone (meth)acrylate added is preferably 0.5 to 5% by weight, more preferably 1 to 3% by weight, based on the total weight of the ionizing radiation-curable resin composition.

The amount of the polyorganosiloxane organic copolymer added is preferably 0.1 to 2% by weight, more preferably 0.3 to 0.5% by weight, based on the total weight of the ionizing radiation-curable resin composition.

If necessary, other various additives may be further added to the ionizing radiation-curable resin containing silicone (meth)acrylate and polyorganosiloxane organic copolymer as additives. Additives usable herein include, for example, thermoplastic resins, such as vinyl chloride-vinyl acetate copolymer, vinyl acetate resin, acrylic resin, and cellulosic resin, extender pigments (fillers) in a fine powder form, such as calcium carbonate, barium sulfate, and antifriction materials described later, lubricants, such as silicone resin and wax, and colorants, such as dyes and pigments.

In order to further impart abrasion resistance to the surface protective layer, if necessary, hard inorganic particles may be added to the surface protective layer.

Inorganic particles usable herein include alumina such as α-alumina, silica, glass, silicon carbide, and diamond particles. The inorganic particles may be spherical, polygonal, flaky, or irregular, or may have other shapes. The average diameter of the inorganic particles is preferably about 3 to 30 $\mu$m. When the average particle diameter is below the above range, the effect of improving the abrasion resistance is lowered, while when the average particle diameter is above the above range, the smoothness of the surface is lowered. The amount of the inorganic particles added is about 5 to 30% by mass based on the total amount of the resin component.

Regarding the ionizing radiation, ultraviolet sources usable herein include ultrahigh pressure mercury lamps, high pressure mercury lamps, low pressure mercury lamps, carbon arc lamps, black light lamps, and metal halide lamps. The wavelength of the ultraviolet light used is generally in the range of 190 to 380 nm. Electron beam sources include those which can apply electrons having an energy of 100 to 1000 KeV, preferably 100 to 300 KeV, for example, various electron beam accelerators, such as Cockcroft-Walton accelerators, van de Graaff accelerators, resonance transformers, insulated core transformers, linear, dynamitron, and high-frequency electron accelerators.

Sealer layer

In particular, when the substrate is a liquid-permeable material, such as a fibrous sheet, a sealer layer 4 may be optionally provided. The sealer layer is formed by coating a resin composition, which has been brought to a liquid state, for example, by gravure coating or roll coating to form a coating and solidifying the coating. The sealer layer 4 may also be formed through full solid printing, for example, by gravure printing. The coverage is about 0.5 to 10 g/m$^2$ on a solid basis, and at least a part of the resin composition is impregnated into the permeable substrate.

The sealer layer is formed, for example, for preventing the thickness of the surface protective layer from being reduced due to the absorption of the coated, uncured, liquid surface protective layer into the permeable substrate, or for preventing uneven formation of the substrate from leading to uneven gloss of the coating, or for enhancing the adhesion of the substrate to the ink of the pattern layer and the surface protective layer to improve the scratch resistance.

The sealer layer may be formed of, for example, one of or a mixture of two or more of urethane resin, acrylic resin, polyester resin, polyvinyl butyral, epoxy resin, and aminoalkyd resin.

For example, urethane resins include two-pack curing type urethane resin, one-pack curing type (moisture curing type) urethane resin, and thermoplastic urethane resin.

The two-pack curing type urethane resin is a urethane resin comprising a polyol as a main agent and an isocyanate as a crosslinking agent (a curing agent). The polyol has two or more hydroxyl groups in its molecule, and examples thereof include polyethylene glycol, polypropylene glycol, acryl polyol, polyester polyol, polyether polyol, polycarbonate polyol, and polyurethane polyol. The isocyanate may be a polyisocyanate having two or more isocyanate groups in its molecule, and examples thereof include aromatic isocyanates, such as 2,4-tolylene diisocyatate, xylene diisocyanate, and 4,4'-diphenylmethane diisocyanate, and aliphatic (or alicyclic) isocyanates, such as 1,6-hexamethylene diisocyanate, isophorone diisocyanate, hydrogenated tolylene diisocyanate, and hydrogenated diphenylmethane diisocyanate. Further, adducts or multimers of the above-described various isocyanates may also be used. For example, an adduct of tolylene diisocyanate and a trimer of tolylene diisocyanate may be used.

Among the above isocyanates, aliphatic (or alicyclic) isocyanates can also improve weathering resistance and heat yellowing resistance and hence are preferred. Specifically, for example, hexamethylene diisocyanate is preferred.

The one-pack curing type urethane resin is a composition comprising a prepolymer having in its molecular end an isocyanate group as an indispensable component. The prepolymer is generally a prepolymer having one or more isocyanate groups at each of its both molecular ends, specifically a polyisocyanate prepolymer having a polycarbonate skeleton, polyurethane skeleton, polybutadiene skeleton, polyester skeleton or other skeleton. The isocyanate groups are reacted with the aid of moisture in the air to cause a chain extension reaction. As a result, a reaction product having in its molecular chain a urea bond is produced. This urea bond is further reacted with the isocyanate group in the molecular end to cause a biuret reaction which causes branching. Thus, a crosslinking reaction takes place.

Acrylic resins include acrylic resins include polymethyl (meth)acrylate, polyethyl (meth)acrylate, polybutyl (meth)acrylate, methyl (meth)acrylate-butyl (meth)acrylate copolymer, methyl (meth)acrylate-styrene copolymer, methyl (meth)acrylate-butyl (meth)acrylate-2-hydroxyethyl (meth)acrylate copolymer, and methyl (meth)acrylate-butyl (meth)acrylate-2-hydroxyethyl (meth)acrylate-styrene copolymer. Here the term "(meth)acrylate" refers to acrylate or methacrylate.

Primer layer

The primer layer 5 may be formed, for example, by gravure coating or roll coating a resin composition, which has been brought to a liquid state, for example, by the preparation of a solution, to form a coating and then solidifying the coating. Further, the formation of the primer layer through full solid printing, for example, by gravure printing is also possible. The primer layer is provided in order to relax the shear stress created at the interface between the surface protective layer and the pattern layer upon cure shrinking at the time of the formation of the surface protective layer and to enhance the adhesion between the surface protective layer and the pattern layer through chemical bonding. This effect contributes to further improved scratch resistance. The coverage is preferably about 0.1 to 5 $g/m^2$ on solid basis.

The resin used in the primer layer may be one of or a mixture of two or more of urethane resin, acrylic resin, polyester resin, polyvinyl butyral and the like. Examples of the urethane resin and the acrylic resin include those described above in connection with the sealer layer.

Substrate as adherend

The decorative sheet according to the present invention may be applied as a surface decorative material onto the surface of various substrates. The substrate will be further described.

The substrate as the adherend is not particularly limited. Examples of substrates include inorganic nonmetallic, metallic, wood-based, and plastic substrates. More specifically, inorganic nonmetallic substrates include those formed of inorganic materials, for example, non-clay ceramic materials, such as sheet-forming cement, extrusion cement, slag cement, ALC (lightweight cellular concrete), GRC (glass fiber-reinforced concrete), pulp cement, wood chip cement, asbestos cement, calcium silicate, gypsum, and gypsum slag, and ceramics, such as earthenware, pottery, porcelain, stoneware, glass, and enamel. Metallic substrates include those formed of metal materials, for example, iron, aluminum, and copper. Wood-based substrates include, for example, veneer, ply wood, particle board, fiber sheet or plate, and laminated wood of cedar, cypress, oak, lauan, teak and the like. Plastic substrates include those formed of, for example, resin materials, such as polypropylene, ABS resin, and phenolic resin.

The substrate may have any shape, for example, may be in the form of a flat plate, a curved plate, or a polygonal column.

Applications

The decorative sheet according to the present invention may be applied, to the above-described substrates, for example, as building interior materials, such as wall, floor or ceiling, surface materials of fittings, such as doors, door frames, or sashes, surface materials of fixture members, such as verandahes or baseboards, and surface materials of furniture, such as chest of drawers, desks, or cabinets.

EXAMPLES

The following examples and comparative examples further illustrate the present invention.

Example 1

Figure 3:
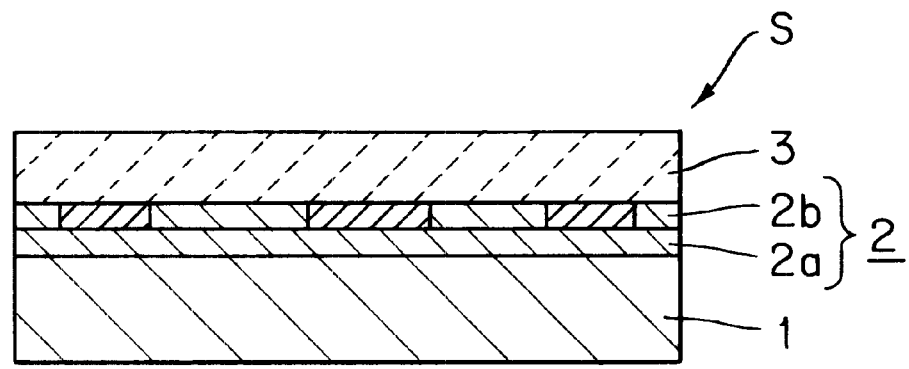
FIG. 3 is a cross-sectional view showing a further embodiment of the decorative sheet according to the present invention.

A decorative sheet S having a layer construction as shown in FIG. 3 was prepared as follows. An acrylic resin impregnated paper having a basis weight of 60 $g/m^2$ was first provided as a substrate 1. A pattern layer 2 was then formed on one side of the substrate 1 as follows. An ink comprising a binder resin composed of a resin mixture of an acrylic resin with a nitrocellulosic resin and a colorant composed of color pigments of titanium white, carbon black, red oxide, and chrome yellow was gravure printed on the whole area of one side of the substrate 1 to form a full solid print layer 2a. Subsequently, an ink comprising a binder resin composed of a resin mixture of a nitrocellulosic resin with an alkyd resin and a colorant composed of color pigments of red oxide, carbon black, and polyazo yellow was gravure printed on the surface of the full solid print layer 2a to form a layer 2b of a woodgrain pattern like a cedar board grain.

Next, an ionizing radiation-curable (electron beam-curable) resin coating composition comprising a polyester acrylate prepolymer and trimethylolpropane triacrylate and, added thereto, silicone acrylate (2% by mass) and a polyorganosiloxane organic copolymer (a block copolymer of polyorganosiloxane with an acrylic polymer) (0.4% by mass) was roll coated on the pattern layer 2 at a coverage of 5 $g/m^2$, followed by application of an electron beam (175 keV, 3 Mrad) to cure by crosslinking the coating, thereby forming a crosslinking-cured product as a surface protective layer 3. Thus, a contemplated decorative sheet was prepared.

Example 2

A decorative sheet was prepared in the same manner as in Example 1, except that, instead of the ionizing radiation-curable (electron beam-curable) resin coating composition used in Example 1, an ionizing radiation-curable resin coating composition comprising a polyester acrylate prepolymer and trimethylolpropane triacrylate and, added thereto, silicone methacrylate (2% by mass) and a polyorganosiloxane organic copolymer (a block copolymer of polyorganosiloxane with an acrylic polymer) (0.4% by mass) was used for the formation of the surface protective layer.

Comparative Example 1

A decorative sheet was prepared in the same manner as in Example 2, except that a coating composition for a surface protective layer was used which was the same as the ionizing radiation-curable (electron beam-curable) resin coating composition for the surface protective layer used in the Example 2 except that the polyorganosiloxane organic copolymer was not contained.

Comparative Example 2

A decorative sheet was prepared in the same manner as in Example 1, except that a coating composition for a surface protective layer was used which was the same as the ionizing radiation-curable (electron beam-curable) resin coating composition for the surface protective layer used in the Example 1 except that finely divided silica (1% by mass) was added as a dispersing material instead of the addition of the polyorganosiloxane organic copolymer.

Comparative Example 3

A decorative sheet was prepared in the same manner as in Example 1, except that a coating composition for a surface protective layer was used which was the same as the ionizing radiation-curable (electron beam-curable) resin coating composition for the surface protective layer used in the Example 1 except that the polyorganosiloxane organic copolymer was not contained.

Comparative Example 4

A decorative sheet was prepared in the same manner as in Example 2, except that a coating composition for a surface protective layer was used which was the same as the ionizing radiation-curable (electron beam-curable) resin coating composition for the surface protective layer used in the Example 2 except that finely divided silica (1% by mass) was added as a dispersing material instead of the addition of the polyorganosiloxane organic copolymer.

Evaluation of properties

The decorative sheets thus obtained were evaluated for the anti-transferability to a cellophane pressure-sensitive adhesive tape. Further, in this connection, the releasability (peel strength) of the surface of the decorative sheets and the stability of the coating compositions for a surface protective layer was evaluated. The results are summarized in Table 1.

Anti-transferability to cellophane pressure-sensitive adhesive tape: The decorative sheet was bonded with a vinyl acetate resin emulsion-type adhesive to a 3 mm-thick lauan ply wood so that the surface protective layer constituted the outermost surface. Thus, a decorative plate was prepared. A cellophane pressure-sensitive adhesive tape (Cello-Tape (registered trademark), manufactured by Nichiban Co., Ltd., width 24 mm, for industrial applications) was then applied to the surface (the surface of the surface protective layer) of the decorative plate, and was then peeled off. This procedure of the application of the tape and the peeling-off of the tape was repeated in an identical portion. At that time, the assembly was visually inspected for the separation of the surface protective layer and the pattern layer. In this case, previously, cuts having a depth, which reached the substrate, were vertically and laterally provided from the surface protective layer side by means of a cutter knife at intervals of 2 mm to form cross-cuts, thereby forming 100 squares (in total; 10 squares in lengthwise direction ×10 squares in lateral direction). Thereafter, the procedure of the application of the tape and the peeling-off of the tape was repeated. In this test, when only the tape was peeled-off, the anti-transferability to a cellophane pressure-sensitive adhesive tape was evaluated as good, while when the pattern layer or other layer, together with the tape, was peeled-off even in one square, the anti-transferability to a cellophane pressure-sensitive adhesive tape was evaluated as failure.

An accelerated aging test for a simulation, where the cellophane pressure-sensitive adhesive tape was applied onto the assembly for a long period of time, was carried out as follows. A cellophane pressure-sensitive adhesive tape was applied onto the cross-cuts in the same manner as described above. The assembly was then stored in an environment of 40° C. for 10 days at the longest. The tape was then peeled-off, followed by evaluation in the same manner as described above.

Stability of coating composition: The ionizing radiation-curable resin coating composition for a surface protective layer was used on two levels to prepare decorative sheets. In one case, the ionizing radiation-curable resin coating composition was used immediately after the preparation, and, in the other case, the ionizing radiation-curable resin coating composition was used after storage at 25° C. for 30 days after the preparation. The decorative sheets thus obtained were evaluated for the anti-transferability to a cellophane pressure-sensitive adhesive tape and the releasability. The stability of the coating composition was evaluated based on the results of evaluation of the anti-transferability to a cellophane pressure-sensitive adhesive tape and the releasability.

Releasability: A decorative plate was prepared in the same manner as described above in connection with the evaluation of the anti-transferability to a cellophane pressure-sensitive adhesive tape. A cellophane pressure-sensitive adhesive tape was applied onto the surface of the decorative plate, and was then peeled off in a direction normal to the surface of the decorative plate (90° peel) to measure peel strength.

TABLE 1

Results of evaluation on properties

| | Anti-transferability to cellophane pressure-sensitive adhesive tape | | | | Releasability (peel strength)*1 Coating composition | |
|---|---|---|---|---|---|---|
| | Coating composition immediately after preparation | | Coating composition after storage | | | |
| | Cross-cut repetition test | Accelerated aging test | Cross-cut repetition test | Accelerated aging test | immediately after preparation | Coating composition after storage |
| Ex. 1 | Good: Not less than 10 times | Good: Not separated in test at 10th day | Good: Not less than 10 times | Good: Not separated in test at 10th day | 4.2 | 4.2 |

TABLE 1-continued

Results of evaluation on properties

| | Anti-transferability to cellophane pressure-sensitive adhesive tape | | | | Releasability (peel strength)*1 Coating | |
|---|---|---|---|---|---|---|
| | Coating composition immediately after preparation | | Coating composition after storage | | composition immed- | Coating composition |
| | Cross-cut repetition test | Accelerated aging test | Cross-cut repetition test | Accelerated aging test | iately after preparaiton | after storage |
| Ex. 2 | Good: Not less than 10 times | Good: Not separated in test at 10th day | Good: Not less than 10 times | Good: Not separated in test at 10th day | 4.0 | 4.0 |
| Comp. Ex. 1 | Failure: Separated at 3rd cross-cut procedure | Failure: Separated in test at 5th day | Failure: Separated at 6th cross-cut procedure | Failure: Separated in test at 8th day | 8.0 | 6.0 |
| Comp. Ex. 2 | Good: Not less than 10 times | Good: Not separated in test at 10th day | Good: Not less than 10 times | Good: Not separated in test at 10th day | 6.0 | 4.2 |
| Comp. Ex. 3 | Failure: Separated at 3rd cross-cut procedure | Failure: Separated in test at 5th day | Failure: Separated at 6th cross-cut procedure | Failure: Separated in test at 8th day | 8.2 | 6.4 |
| Comp. Ex. 4 | Good: Not less than 10 times | Good: Not separated in test at 10th day | Good: Not less than 10 times | Good: Not separated in test at 10th day | 6.5 | 4.5 |

*1: The peel strength value is in N/25 mm-width.

Discussion of results

As shown in Table 1, for the decorative sheets of Examples 1 and 2, the anti-transferability to a cellophane pressure-sensitive adhesive tape was good, and the pattern layer or the like was not separated even after the repetition of the procedure of the application of the tape and the peeling-off of the tape ten times or more. Also in the accelerated aging test, the pattern layer or other layer was not separated in the 10-day test, that is, the anti-transferability was good. Also for the stability of the coating composition, the decorative sheet using the coating composition after storage had good anti-transferability to a cellophane pressure-sensitive adhesive tape in tests including the accelerated aging test. Further, the peel strength was suitable, that is, was not excessively high and was not excessively low, for both the coating composition immediately after the preparation and the coating composition after the storage.

By contrast, for the decorative sheets of Comparative Example 1 and Comparative Example 3 wherein the addition of the polyorganosiloxane organic copolymer has been omitted, for the anti-transferability to a cellophane pressure-sensitive adhesive tape, the assembly failed, that is, separation occurred, at the third cycle of the procedure of the application of the tape and the peeling-off of the tape. Also in the accelerated aging test, the assembly failed, that is, separation occurred, at the fifth cycle of the procedure of the application of the tape and the peeling-off of the tape. For the stability of the coating composition, the peel strength for the coating composition after the storage was lower than the peel strength for the coating composition immediately after the preparation. Also for the anti-transferability to a cellophane pressure-sensitive adhesive tape, three times for the coating composition immediately after the preparation increased to six times for the coating composition after the storage. Further, also for the accelerated aging test, five days for the coating composition immediately after the preparation increased to 8 days for the coating composition after the storage. Thus, there was a variation in properties.

For the decorative sheets of Comparative Example 2 and Comparative Example 4 wherein finely divided silica was added as a dispersing agent instead of the polyorganosiloxane organic copolymer, the results of the tests on the anti-transferability to a cellophane pressure-sensitive adhesive tape including the accelerated aging test were good as with the decorative sheets of Examples 1 and 2. However, for the stability of the coating compositions, although there was no change in the anti-transferability to a cellophane pressure-sensitive adhesive tape, the peel strength for the coating composition after storage was lower than that for the coating composition immediately after the preparation, and there was a variation in force necessary for peeling off the cellophane pressure-sensitive adhesive tape. Thus, the stability of the coating compositions was poor.

As is apparent from the foregoing description, unlike the decorative sheets of Comparative Examples 1 to 4, only the decorative sheets of Examples 1 and 2 exhibited stable anti-transferability to a cellophane pressure-sensitive adhesive tape without a variation in test results including peel strength.

Thus, the decorative sheets according to the present invention have satisfactory anti-transferability to a cellophane pressure-sensitive adhesive tape and, in addition, are free from a variation in properties and thus can be stably produced.

What is claimed is:

1. A decorative sheet comprising:

a substrate for a decorative sheet;

a pattern layer provided on the substrate for a decorative sheet;

a surface protective layer; and a primer layer provided between the pattern layer and the surface protective layer to relax shear stress caused at the interface between the pattern layer and the surface protective layer and, at the same time, to enhance the adhesion between the pattern layer and the surface protective layer, said surface protective layer being formed of a crosslinked cured product of an ionizing radiation-curable resin composition, said composition containing, as an additive, a combination of silicone (meth)acrylate with a polyorganosiloxane organic copolymer.

2. The decorative sheet according to claim 1, wherein the ionizing radiation-curable resin composition contains a prepolymer or an oligomer having in its molecule a radically polymerizable unsaturated bond or a cationically polymerizable functional group and/or a monomer having in its molecule a radically polymerizable unsaturated bond or a cationically polymerizable functional group.

3. The decorative sheet according to claim 1, wherein the substrate for a decorative sheet is formed of a liquid-permeable material and a sealer layer for rendering the surface of the substrate liquid-impermeable is provided on the substrate.

\* \* \* \* \*